(12) United States Patent
Tseng et al.

(10) Patent No.: US 9,048,470 B2
(45) Date of Patent: Jun. 2, 2015

(54) FUEL DIRECTING REACTION DEVICE FOR PASSIVE FUEL CELL

(71) Applicant: National Tsing Hua University, Hsinchu (TW)

(72) Inventors: Fan-Gang Tseng, Hsinchu (TW); Yi-Shiuan Wu, Hsinchu (TW); I-Chi Fang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 223 days.

(21) Appl. No.: 13/912,104

(22) Filed: Jun. 6, 2013

(65) Prior Publication Data

US 2014/0099570 A1 Apr. 10, 2014

(30) Foreign Application Priority Data

Oct. 8, 2012 (TW) .............................. 1011037070 A

(51) Int. Cl.
*H01M 8/04* (2006.01)
*H01M 8/10* (2006.01)
*H01M 4/92* (2006.01)

(52) U.S. Cl.
CPC ........ *H01M 8/04201* (2013.01); *H01M 8/1009* (2013.01); *H01M 8/1011* (2013.01); *H01M 4/926* (2013.01); *H01M 8/04186* (2013.01); *Y02E 60/521* (2013.01)

(58) Field of Classification Search
CPC .......... H01M 8/04201; H01M 8/1009; H01M 8/04186; H01M 4/926; H01M 8/1011; Y02E 60/521
USPC ........................................................ 429/514
See application file for complete search history.

(56) References Cited

U.S. PATENT DOCUMENTS

2006/0183015 A1* 8/2006 Tseng .............................. 429/38
2009/0123810 A1* 5/2009 Devoe et al. .................... 429/34

(Continued)

FOREIGN PATENT DOCUMENTS

| TW | 200631228 | 2/2005 |
|---|---|---|
| TW | I260103 B | 8/2006 |
| TW | 201131874 A | 9/2011 |

OTHER PUBLICATIONS

I-Chi Fang, et al. "Design and fabrication of fuel-self-propelled anode plate for passive micro direct methanol fuel cell," The 4th International Symposium on Microchemistry and Microsystems, ISMM, Jun. 10-13, 2012, National Tsing Hua University, Hsinchu County Taiwan, p. 200-201.

(Continued)

*Primary Examiner* — Stewart Fraser
(74) *Attorney, Agent, or Firm* — Muncy, Geissler, Olds & Lowe, P.C.

(57) ABSTRACT

A fuel directing reaction device for a passive fuel cell comprises: a substrate, which has a first side and a second side opposite to the first side; a fuel reservoir, which is disposed on the first side of the substrate; a fuel introducing microfluidic channel portion, which is disposed on the first side of the substrate and connected with the fuel reservoir; a first rib array portion, which is disposed on the first side of the substrate, and connected with the fuel introducing microfluidic channel portion; a second rib array portion, which is disposed on the first side of the substrate, and connected with the first rib array; and a plurality of reaction holes, each of which is disposed on the open side of the V-shaped portion of the second ribs and extends through the substrate to connect the first side and the second side of the substrate.

11 Claims, 11 Drawing Sheets

(56) References Cited

U.S. PATENT DOCUMENTS

| | | | |
|---|---|---|---|
| 2009/0226781 A1* | 9/2009 | Devoe et al. ............... | 429/20 |
| 2009/0324999 A1* | 12/2009 | Devoe et al. ............... | 429/13 |
| 2010/0104910 A1* | 4/2010 | Devoe et al. ............... | 429/26 |

OTHER PUBLICATIONS

Yi-Shiuan Wu, et al. "Design and fabrication of fuel-self-propelled reaction device for passive direct methanol fuel cell anodes," The 29th National Conference on Mechanical Engineering, 2012, National Sun Yat-Sen University, Kaohsiung Taiwan—Abstract on last page.

Y.-S. Wu, et al. "Design and fabrication of fuel-self-propelled reaction device for passive micro direct methanol fuel cell anodes," Micro Electro Mechanical Systems (MEMS), Jan. 20-24, 2013, IEEE 26th International Conference, Taipei Taiwan, p. 885-888.

* cited by examiner

FUEL DIRECTING REACTION DEVICE FOR PASSIVE FUEL CELL

CROSS REFERENCE TO RELATED APPLICATION

This application claims the benefits of the Taiwan Patent Application Number 101137070, filed on Oct. 8, 2012, the subject matter of which is incorporated herein by reference.

BACKGROUND OF THE INVENTION

1. Field of the Invention

The present invention relates to a fuel directing reaction device for a passive fuel cell, more particularly, for a direct-liquid fuel cell.

2. Description of Related Art

With the advancement of technology, the demand for energy is increasing. However, the excessive use of traditional fossil fuels has caused resource depletion problem and numerous environmental pollution associated with several climate issues, such as global warming. Therefore, it is necessary to develop an alternative and renewable energy having high efficiency and low emission, such as solar power, geothermal power, wind power, and fuel cells, etc. Fuel cells can convert chemical energy into electricity with high conversion efficiency based on simple operating principles. Therefore, it is considered to have the potential of being developed as a reliable power generator.

A fuel cell is a kind of power supply, which generates electricity from the conversion of chemical energy through electrochemical reactions. In the fuel cells, hydrogen-containing fuels, such as hydrogen gas, methanol, ethanol, natural gas or liquid gasoline, can be delivered into the anode, and then be oxidized and decomposed into hydrogen ions (protons) and electrons at the anode. The protons migrate through the proton exchange membrane to the cathode, and react with oxygen and electrons which are propelled from the anode to the cathode through an external circuit to form water by the reduction reaction. Because the products of the fuel cells are water and carbon dioxide, it is considered to be a clean, environmentally friendly, and sustainable energy source.

As the fuel cell, direct methanol fuel cell (DMFC) has been extensively developed as a portable power source in recent years. Unlike proton exchange membrane fuel cell (PEMFC) that uses hydrogen as a fuel, the advantage of employing DMFC is mainly due to the safety handling and storage convenience of methanol. However, in the development of the liquid-feed DMFCs, it is critical to enhance the flow velocity and the uniformity of methanol distribution for the improvement in the methanol utilization and reaction efficiency of the fuel cell. In general, the methanol fuel is delivered into the reaction zone by means of the microfluidic channel to participate in the electrochemical reactions. The microfluidic channels reported for the fuel cells in the conventional art include straight-type, grid-type, paralleled-type, interdigitated-type, and serpentine-type microfluidic channels. Nevertheless, those types of the microfluidic channels cannot effectively enhance the flow velocity and the uniformity of fuel distribution. In the current development of the fuel cells, successful removal of the gas products generated from the reactions is also important to improve the reaction efficiency of the fuel cells. Consequently, it is in urgent demand to resolve the above problems to heighten the efficiency of the fuel cells.

SUMMARY OF THE INVENTION

The object of the present invention is to provide a fuel directing reaction device for a passive fuel cell, which can improve the fuel delivery velocity and uniformity of the fluid flow distribution by specific microfluidic channel designs. The fuel will flow through a delivery and reaction zone in contact with the catalyst for the follow-up electrochemical reactions.

To achieve the object, the present invention provides a fuel directing reaction device for a passive fuel cell comprising: a substrate, which has a first side and a second side opposite to the first side; a fuel reservoir, which is disposed on the first side of the substrate; a fuel introducing microfluidic channel portion, which is disposed on the first side of the substrate and connected with the fuel reservoir, wherein the fuel introducing microfluidic channel portion can self-propel a fuel from the fuel reservoir by a capillary force; a first rib array portion, which is disposed on the first side of the substrate and connected with the fuel introducing microfluidic channel portion, wherein the first rib array portion comprises a plurality of first ribs in an interlaced arrangement, and each has a V-shaped portion with an open side toward the fuel introducing microfluidic channel portion; a second rib array portion, which is disposed on the first side of the substrate, wherein the second rib array portion comprises a plurality of second ribs in an interlaced arrangement, and each has a V-shaped portion with an open side toward the first rib array portion; and a plurality of reaction holes, each of which is disposed on the open side of the V-shaped portion of the second ribs and extends through the substrate to connect the first side and the second side of the substrate.

In the present invention, each of the reaction holes can have a plurality of carbon nanotubes decorated with catalysts incorporated into inner walls thereof. Particularly, the inner walls of the reaction holes can vertically extend through the substrate, and the length of the carbon nanotubes has a decreasing trend from the second side of the substrate to the first side of the substrate, so as to form the taper reaction holes expanded toward the direction of the first side of the substrate. When carbon dioxide generated from the oxidation reaction of the fuel, it can be vented by the reaction holes rapidly. For the catalysts supported on carbon nanotubes in the reaction holes, it can be a fuel oxidation catalyst, such as Pt or Pt-based alloy. Moreover, other reagents for enhancing the reaction efficiency of the fuel cell, such as fuel catalyst, can also be deposited on the inner walls of the reaction holes. The diameter and length of the carbon nanotubes can be controlled by the deposition thickness of the catalysts (iron, cobalt and nickel) and the growth time of the carbon nanotube. In the present invention, the size of the reaction holes on the first side of the substrate can be depended on the length of the carbon nanotubes. Preferably, the reaction holes on the first side of the substrate have the hole diameter in a range of 10-50 μm, more preferably in a range of 20-40 μm.

In the present invention, each of the first ribs and second ribs in the first rib array portion and second rib array portion has a V-shaped portion, which is able to rapidly deliver the fuel in lateral and axial directions of the V-shaped portion simultaneously, so as to enhance the delivery efficiency and distribution uniformity of the fuel. The interlaced arrangement of the first ribs and second ribs are capable of delivering the fuel uniformly and rapidly to the delivery and reaction zone by a nozzle-diffuser effect.

In the present invention, the first ribs in the first rib array portion can be designed as any rib structures having a V-shaped portion. Preferably, the first ribs could be triangle ribs, V-shaped ribs, Y-shaped ribs or a combination thereof, and V-shaped ribs are more preferable. Additionally, the second ribs of the second rib array portion also should comprise a V-shaped structure. Preferably, the second ribs could be triangle ribs, V-shaped ribs, Y-shaped ribs or a combination thereof, and V-shaped ribs are more preferable.

To ensure that the fuel can be delivered rapidly and uniformly by both the first ribs and the second ribs, the first ribs and the second ribs can have specific projective length ratio of the lateral side to the axial side. Preferably, each of the first ribs has the projective length ratio of lateral side to the axial side from 2:1 to 2:5, more preferably 2:2 (or 1:1). Based on this specific ratio, the flow rate of a working fluid along the lateral side of the V-shaped portion is faster than that along the axial direction (or tip side) of the V-shaped portion, so that the flow field of the fluid can be fulfilled rapidly along the entire first rib array portion. On the other hand, preferably, each of the second ribs has the projective length ratio of lateral side to the axial side from 2:1 to 2:5, more preferably 2:1. According to this preferable ratio, the fuel can spread quickly and uniformly over the second rib array portion and simultaneously deliver into the inner walls of the reaction holes.

In addition to the first ribs, the first rib array portion can further comprise a plurality of arrow-shaped ribs disposed among the first row of the first rib array portion which are defined as the most adjacent row to the fuel introducing microfluidic channel portion. Moreover, the arrow-shaped ribs can further connect with the fuel introducing microfluidic channel portion, so that the fuel will be introduced into the first rib array portion more easily.

In the present invention, microfluidic channels of the fuel introducing microfluidic channel portion can be coated with a hydrophilic material or subjected to a hydrophilic treatment on the inner walls thereof, so as to enhance the fuel delivery efficiency.

Since all of the elements of the fuel directing reaction device of the present invention are arranged on one substrate, it is unnecessary to undergo any element assembly processes. Therefore, the device of the present invention has benefits of cost down and simplifying the manufacturing process.

In addition, the fuel stored in the fuel reservoir can be passively propelled into the first rib array portion by capillary effect created by the dense arrangement of the micro-channels of the fuel introducing microfluidic channel portion. During the process of the fuel oxidation in the reaction zone, the capillary force can also prevent the delivered fuel from backflow by generated gas from the reaction holes. Therefore, the backflow issue that adversely affects the fuel delivery can be resolved. In the first rib array portion, because each of the first ribs has a V-shaped portion, the fuel is able to be effectively delivered both lateral side and axial side of the V-shaped portion simultaneously. Furthermore, owing to the interlaced arrangement of the first ribs, the fuel can be spread over the entire first rib array portion, and then effectively delivered into the second rib array portion. As the arrangement of the first ribs, if the first rib array portion contains "N" rows of the first ribs is an integer of 2 or more), each of the first ribs in the "n−1" row can be arranged to correspond the interval between the adjacent first ribs in the "n" row (n is an integer of 2 to N). Accordingly, the compact arrangement can obtain high fuel delivery efficiency. When the fuel is delivered from the first rib array portion into the second rib array portion, the fuel can spread over the entire second rib array portion and the reaction zone for the electrochemical reaction by the specific geometric ratio and the interlaced arrangement of the V-shaped ribs. Finally, because the reaction holes in the delivery and reaction zone vertically extend through the substrate and expand toward the direction of the first side of the substrate, the gas generated from the reaction holes during the fuel oxidation reaction will be smoothly vented toward the direction of the first side of the substrate. Accordingly, the fuel directing reaction device of the present invention can solve the conventional problems of limited delivery velocity, non-uniform distribution and backflow phenomenon of the fuel. In addition, the present invention can also solve the problem of venting the gas products from the reaction holes during the oxidation of the fuel. Therefore, the fuel directing reaction device of the present invention can be expected to obtain highly efficient power generation.

DETAILED DESCRIPTION OF THE PREFERRED EMBODIMENT

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

Example 1

Estimation for Influence of Different Rib Shapes on Fluid Delivery

1-1 V-Shaped Ribs

Figure 1:
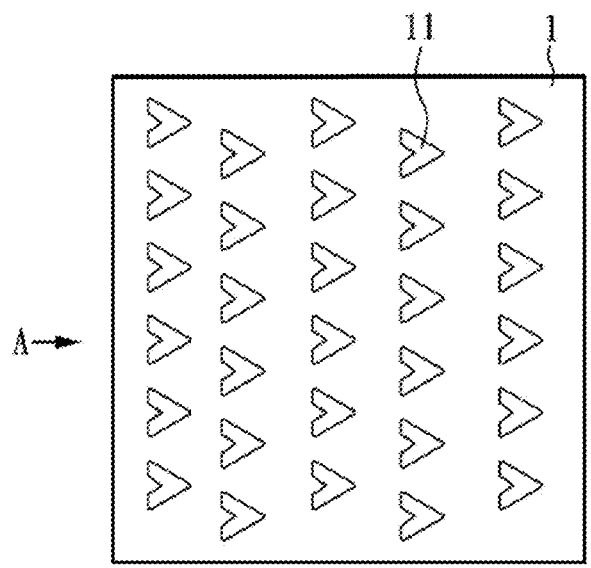
FIG. 1 is a schematic view of a delivery and reaction zone having an interlaced V-shaped rib array in accordance with the example 1-1 of the present invention.

Please refer to FIG. 1, which is a schematic view of a delivery and reaction zone having V-shaped ribs in accordance with the example 1-1 of the present invention. The present example provides the delivery and reaction zone 1 of 6 mm×6 mm with the V-shaped ribs 11 in an interlaced arrangement. In this figure, the open side of the V-shaped ribs 11 is opposite to the direction of A (i.e., a propelling direction of the fluid), and the projective lengths of the lateral side and the axial side of the V-shaped ribs 11 are 50 µm and 25 µm, respectively.

Figure 2:
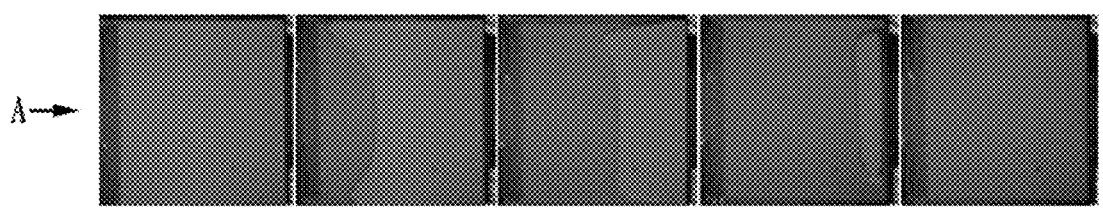
FIG. 2 is a picture view of the flow-field distribution of a working fluid in accordance with example 1-1 in the present invention.

Please refer to FIG. 2, which is a picture view of estimating the fluid delivery in accordance with example 1-1 in the present invention. A fluid is self-propelled into the delivery and reaction zone 1 along the direction of A. According to the result of the observation, it can be found that the fluid can be quickly and uniformly distributed on the entire delivery and reaction zone 1 in about 820 milliseconds (ms).

1-2 Rectangular Ribs

Figure 3:
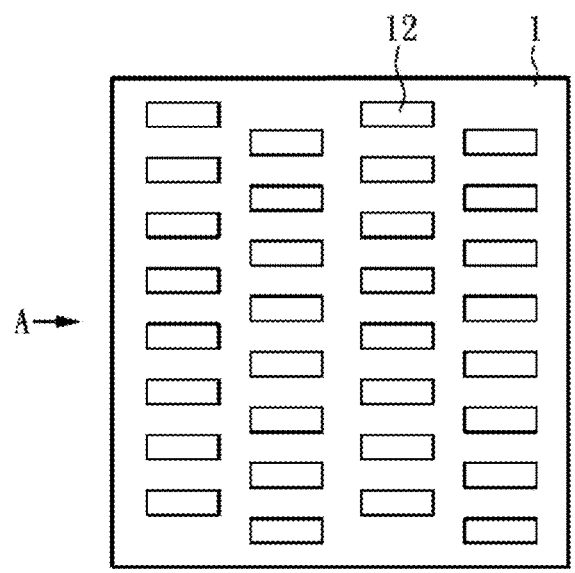
FIG. 3 is a schematic view of a delivery and reaction zone having an interlaced rectangular rib array in accordance with example 1-2 of the present invention.

Please refer to FIG. 3, which is a schematic view of a delivery and reaction zone having rectangular ribs in accordance with example 1-2 of the present invention. The present example provides the delivery and reaction zone 1 of 6 mm×6 mm with the rectangular ribs 12 in an interlaced arrangement. The length and the width of the rectangular ribs 12 are 30 µm and 15 µm, respectively.

Figure 4:
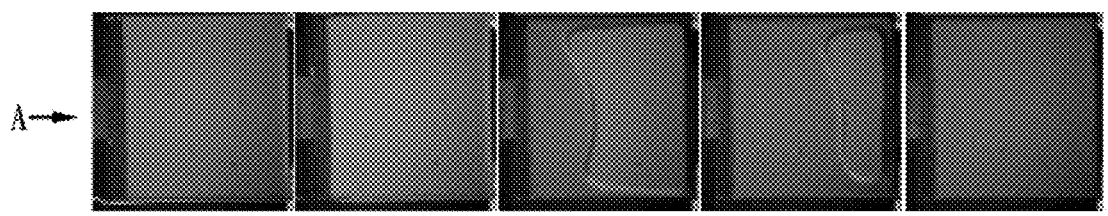
FIG. 4 is a picture view of the flow-field distribution of a working fluid of the example 1-2 of the present invention.

Please refer to FIG. 4, which is a picture view of estimating fluid delivery of the example 1-2 of the present invention. A fluid is self-propelled into the delivery and reaction zone 1 along the direction of A. According to the result, it is apparent that the fluid is distributed along the margin of the delivery and reaction zone 1 and then spread on the entire delivery and reaction zone 1 in about 2298 milliseconds (ms). Therefore, the delivery and reaction zone 1 having rectangular ribs cannot enable the fluid to distribute quickly and uniformly.

1-3 Circular Ribs

Figure 5:
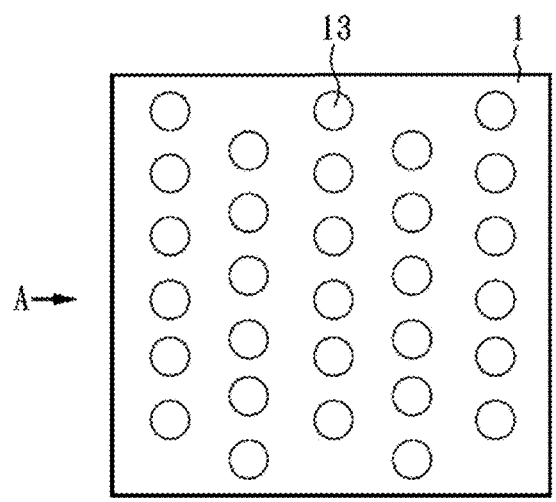
FIG. 5 is a schematic view of a delivery and reaction zone having an interlaced circular rib array in accordance with example 1-3 of the present invention.

Please refer to FIG. 5, which is a schematic view of a delivery and reaction zone having circular ribs in accordance with example 1-3 of the present invention. The present invention provides a delivery and reaction zone 1 of 6 mm×6 mm with the circular ribs 13 having a diameter of 25 µm in an interlaced arrangement.

Figure 6:
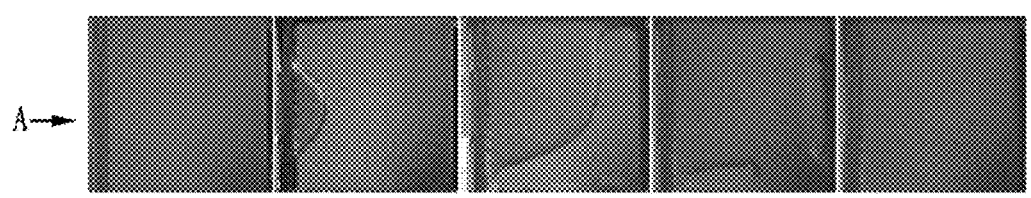
FIG. 6 is a picture view of the flow-field distribution of a working fluid delivery of the example 1-3 of the present invention.

Please refer to FIG. 6, which is a picture view of estimating fluid delivery of the example 1-3 of the present invention. A fluid is self-propelled into the delivery and reaction zone 1 along the direction of A, According to the result, it can be found that the fluid flows from the upper left corner to the lower right corner of the delivery and reaction zone 1, and then gradually distributes on the entire delivery and reaction zone 1 in about 2312 milliseconds (ms). Therefore, the delivery and reaction zone 1 having circular ribs cannot enable the fluid to distribute quickly and uniformly.

According to the results of the examples 14 to 1-3, it can be recognized that the V-shaped ribs can guide the fluid to the delivery and reaction zone rapidly and uniformly by the intersection of the two inclined planes of the V-shaped ribs. In addition, the interlaced arrangement of the V-shaped ribs can effectively enable the fluid to deliver quickly and uniformly on the delivery and reaction zone through the nozzle-diffuser effect. That is the reason why the fluid can be rapidly and uniformly distributed on the entire delivery and reaction zone having V-shaped ribs in accordance with example 1-1.

Example 2

Fuel Directing Reaction Device for Passive Fuel Cell

Figure 7:
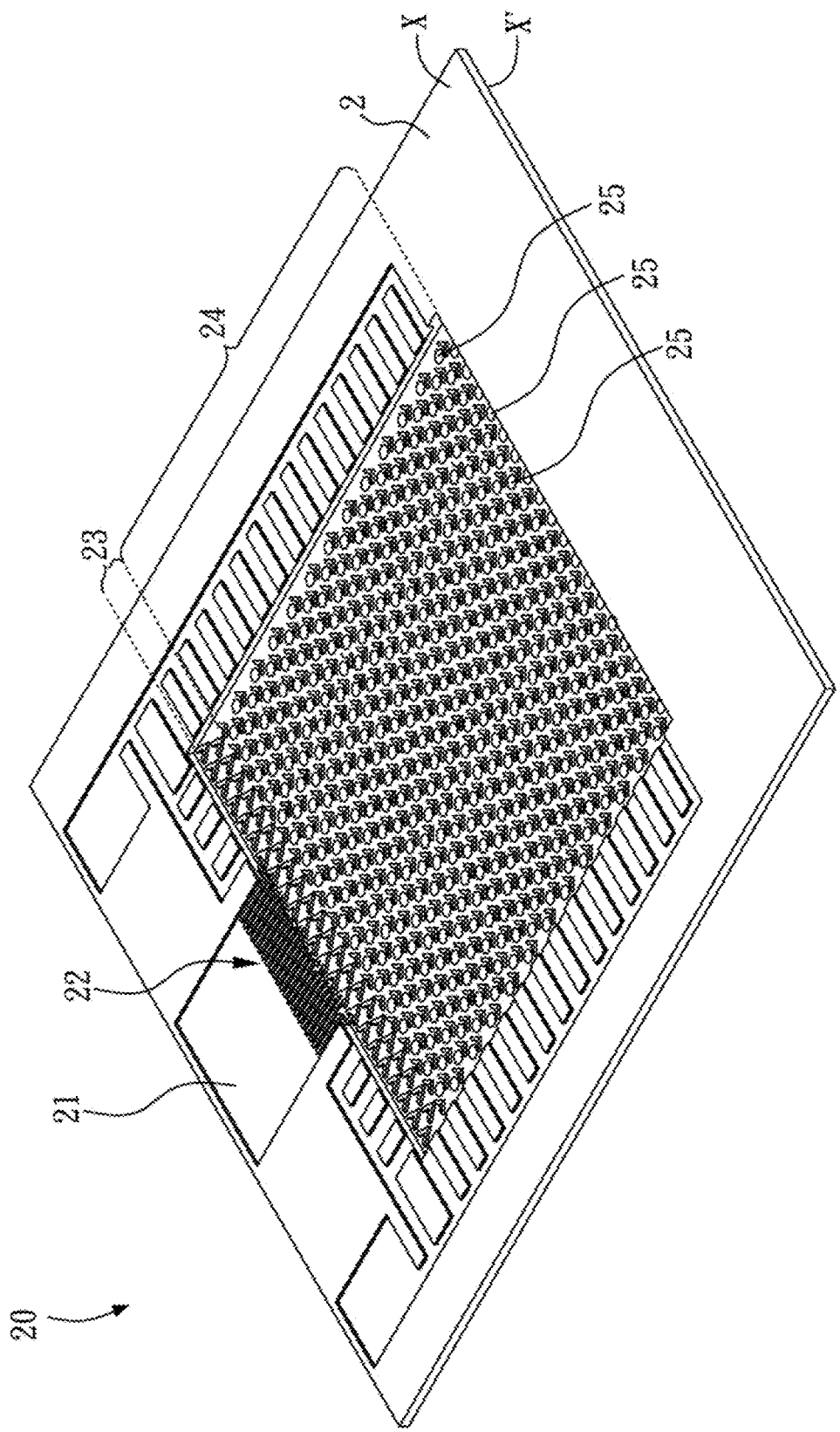
FIG. 7 is a schematic view of the fuel directing reaction device in accordance with example 2 of the present invention.
Figure 8:
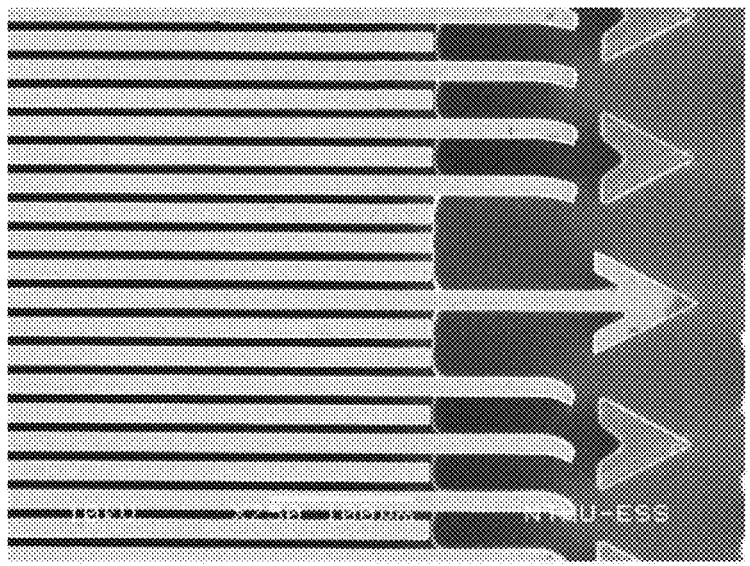
FIG. 8 is a scanning electron micrograph of the fuel introducing microfluidic portion of the fuel directing reaction device in accordance with example 2 of the present invention.

Referring to FIG. 7 in accompany with FIG. 8, FIG. 7 is a schematic view of the fuel directing reaction device 20 for the passive fuel cell in accordance with example 2 of the present invention, and FIG. 8 is a scanning electron micrograph of the fuel introducing microfluidic portion of the fuel directing reaction device 20 in accordance with example 2 of the present invention. The present example discloses that the fuel directing reaction device 20 for the passive fuel cell consists of a substrate 2, which has a first side X and a second side X' opposite to the first side X; a fuel reservoir 21, which is disposed on the first side X of the substrate 2; a fuel introducing microfluidic channel portion 22, which is disposed on the first side X of the substrate 2 and connected with the fuel reservoir 21, wherein the fuel introducing microfluidic channel portion can self-propel a fuel from the fuel reservoir 21 by a capillary force; a first rib array portion 23, which is disposed on the first side X of the substrate 2 and connected with the fuel introducing microfluidic channel portion 22; a second rib array portion 24, which is disposed on the first side X of the substrate 2 and connected with the first rib array portion 23; and a plurality of reaction holes 25, which are disposed on the second rib array portion 24 and extend through the substrate 2 to connect the first side X and the second side X' of the substrate 2.

Refer to FIG. 8, the fuel introducing microfluidic channel portion 22 connected with the first rib array portion 23 comprises a plurality of microfluidic channels 221 having a width of less than 5 µm, preferably 1 µm. In order to improve the capillary flow of the fluid passively propelled from the fuel reservoir 21 to the delivery and reaction zone 1, the inner walls of the microfluidic channels 221 can be coated with a hydrophilic material or subjected to a hydrophilic treatment.

Figure 9:
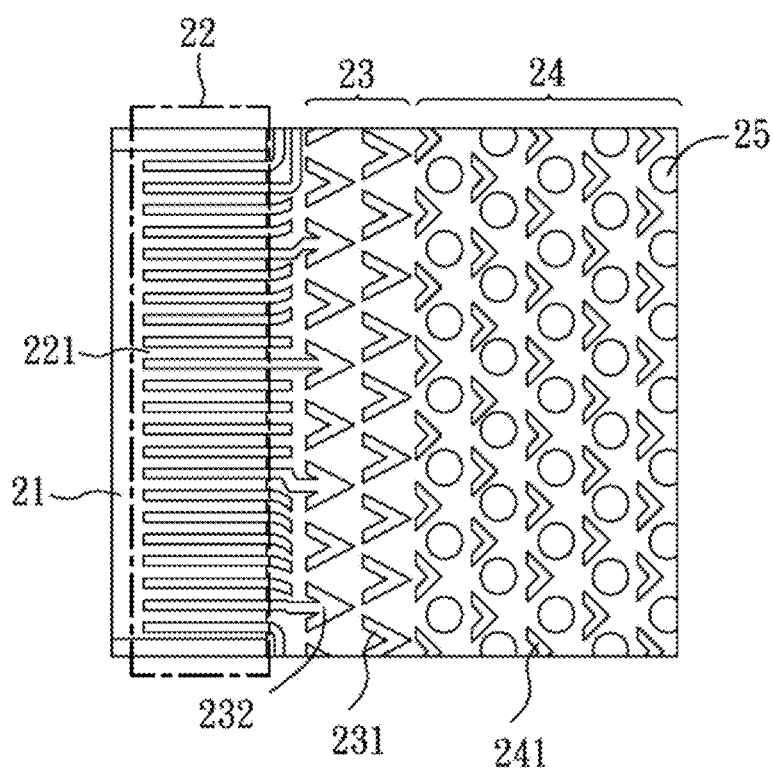
FIG. 9 is a schematic view of the partial fuel directing reaction device in accordance with example 2 of the present invention.
Figure 10:
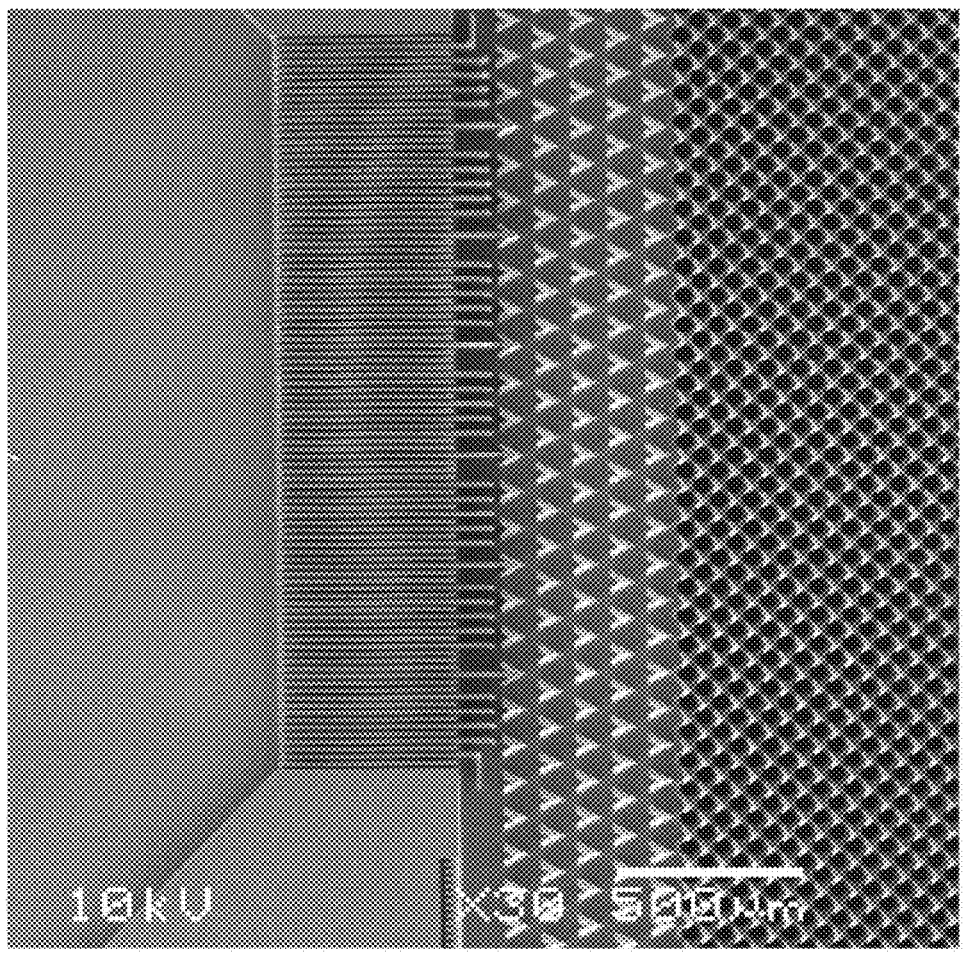
FIG. 10 is a scanning electron micrograph of the partial fuel directing reaction device in accordance with example 2 of the present invention.

Refer to FIG. 9 and FIG. 10, FIG. 9 is a schematic view of the partial fuel directing reaction device 20 in accordance with example 2 of the present invention, and FIG. 10 is a scanning electron micrograph of the partial fuel directing reaction device 20 in accordance with example 2 of the present invention. The first rib array portion 23 comprises a plurality of first ribs 231 in an interlaced arrangement. Each of the first ribs 231 is a V-shaped rib with an open side toward the fuel introducing microfluidic channel portion 22, which can introduce the fluid to flow into the second rib array portion 24. The first rib array portion 23 further comprises a plurality of arrow-shaped ribs 232 disposed among the first row of the first rib array portion 23, in which the first row is defined as the most adjacent row to the fuel introducing microfluidic channel portion 22. The second rib array portion 24 comprises a plurality of the second ribs 241 in an interlaced arrangement. Each of the second ribs 241 is a V-shaped rib with an open side toward the first rib array portion 23.

Figure 11:
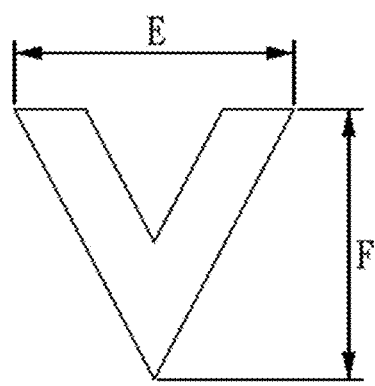
FIG. 11 is a schematic view of the first rib in accordance with example 2 of the present invention.

Refer to FIG. 11, the figure shows a schematic view of the first ribs in accordance with example 2 of the present invention. In the figure, the projective length ratio of the lateral side E and the axial side F of each first rib 231 is 1:1. Through the combination of the geometric ratio and the interlaced arrangement of the first ribs, the fluid flow rate along the lateral side of the V-shaped array portion 23 is faster than that toward the tip side of the V-shaped array portion 23, so that the fluid can be delivered quickly and uniformly on the entire first rib array portion 23.

Figure 12:
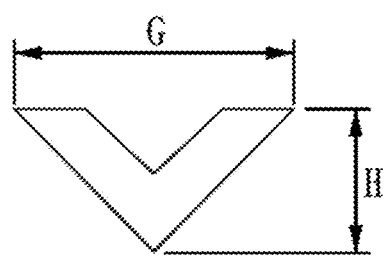
FIG. 12 is a schematic view of the second rib in accordance with example 2 of the present invention.

Refer to FIG. 12, the figure shows a schematic view of the second ribs in accordance with example 2 of the present invention. In the figure, the projective length ratio of the lateral side G and the axial side H of each second rib 241 is 2:1. Based on the design of the second ribs, the fluid can not only be delivered quickly and uniformly, but also spread over the entire second rib array portion 24, wherein the fluid can be effectively delivered to each reaction hole 25 simultaneously.

The reaction holes 25, each of which is disposed on the open side of the V-shaped portion of the second ribs 241, and extends through the substrate 2 to connect the first side X and the second side X' of the substrate 2.

Figure 13:
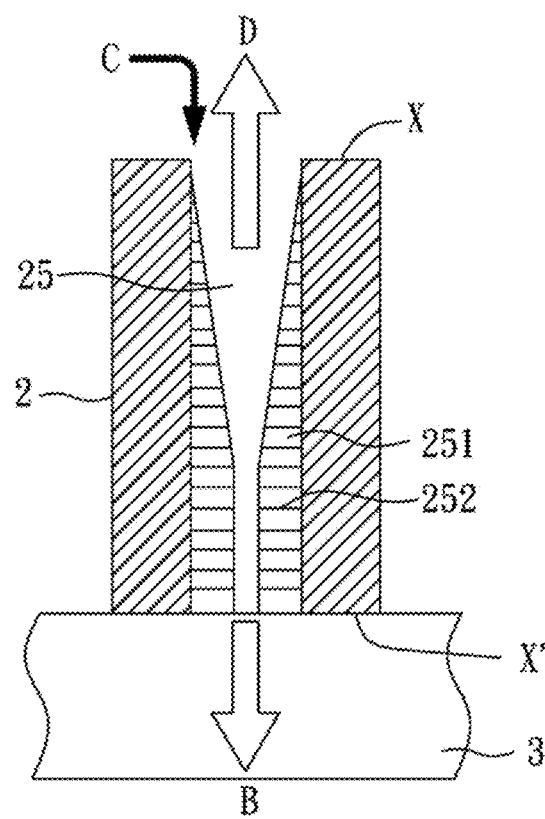
FIG. 13 is the cross-sectional view of the reaction hole in accordance with example 2 of the present invention.
Figure 14:
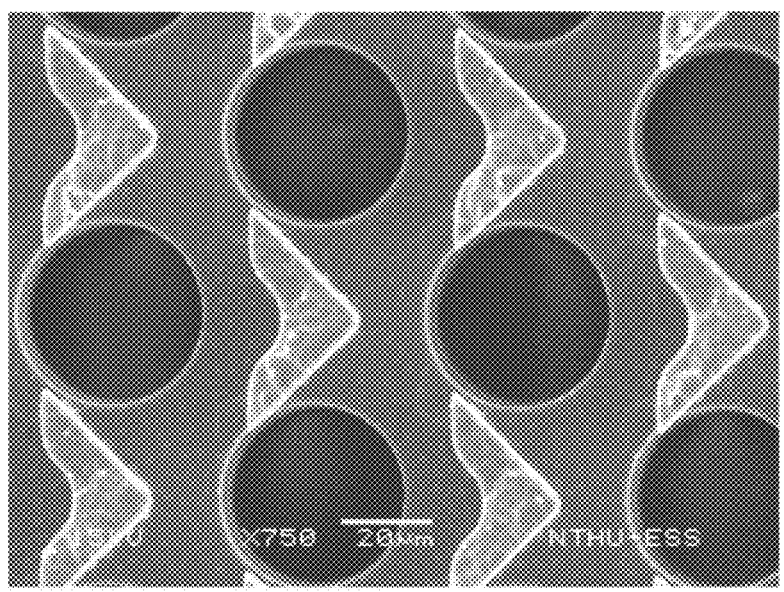
FIG. 14 is a scanning electron microscope top-view of the reaction hole array beside the interlaced V-shaped rib array in accordance with example 2 of the present invention.

Refer to FIG. 13 and FIG. 14, FIG. 13 is the cross-sectional view of the reaction hole in accordance with example 2 of the present invention, and FIG. 14 is a scanning electron micrograph top-view of the reaction hole array beside the interlaced V-shaped rib array in accordance with example 2 of the present invention. In the present example, each of the reaction holes 25 with a hole diameter of about 40 μm on the first side X of the substrate 2 has a plurality of carbon nanotubes 252 decorated with catalysts 251 incorporated into inner walls thereof. The diameter and length of the carbon nanotubes 252 can be controlled by the deposition thickness of the catalysts (iron, cobalt and nickel) and the growth time of the carbon nanotubes, so that the length of the carbon nanotubes 252 has a increasing trend from the first side X of the substrate 2 to the second side X' of the substrate 2 so as to form the taper reaction holes 25 expanded toward the direction of the first side X of the substrate 2. The reaction holes 25 extend through the substrate 2 from the first side X to the second side X'. Under the second side X' of the substrate 2, a solid proton exchange membrane 3 (Nafion®) is disposed to transport protons (hydrogen ions) generated from the oxidation reaction of a fuel (such as methanol) along the direction of B to the cathode. In the present example, when the fuel flows into the reaction holes 25 in the direction of C, the oxidation reaction of methanol ($CH_3OH+H_2O \rightarrow CO_2+6H^++6e^-$) can be initiated on the surface of the catalysts 251 supported on the carbon nanotubes 252, and carbon dioxide generated from the oxidation reaction can be vented by the taper reaction holes in the direction of D to improve the reaction efficiency of the fuel cell.

Figure 15:
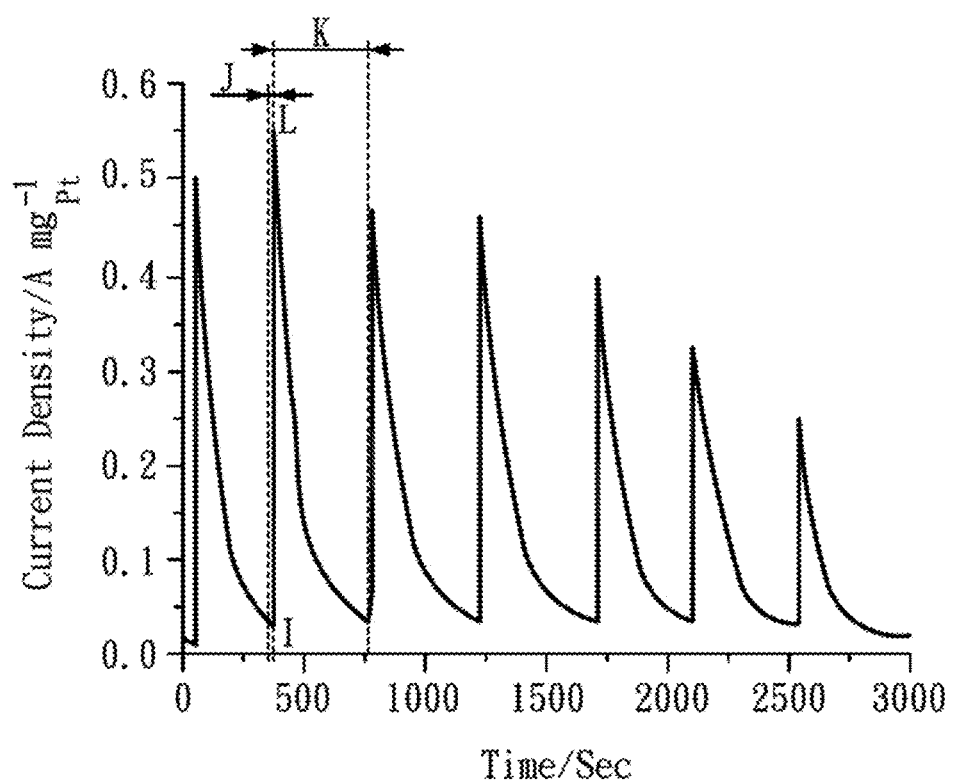
FIG. 15 shows the real-time electrochemical response of the methanol oxidation reaction for the fuel directing reaction device in passive fuel-feed mode in accordance with example 2 of the present invention.

Refer to FIG. 15, which shows the real-time electrochemical response (current density versus time) of the methanol oxidation reaction for the fuel directing reaction device 20 in passive fuel-fed mode in accordance with example 2 of the present invention. The result is obtained by using the fuel directing reaction device 20 of example 1 with the V-shaped ribs. The stability evaluation of the fuel directing reaction device 20 of Example 1 is conducted at the potentiostatic mode of 0.6 $V_{SCE}$ with adding the methanol solution dropwise to the fuel reservoir 21 using a micro-pipetter (3 μl/time, 7 times) within 50 minutes. In FIG. 15, it can be found that the fuel directing reaction device 20 is capable of generating electricity sustainably and effectively by feeding the fuel passively. In addition, the average rise time J required from the passive supply of methanol in the fuel reservoir I to the peak current density L is about 6.3±0.5 seconds, then the fall time K with a decrease in the peak current density L from 100% to 10% is about 5-7 minutes. Moreover, the fall time K elongates with an increasing number of fuel-feeding. The peak current density L degraded by about 50% within 50 minutes mainly due to the carbon monoxide poisoning on the surface of Pt catalysts.

Although the present invention has been explained in relation to its preferred embodiment, it is to be understood that many other possible modifications and variations can be made without departing from the spirit and scope of the invention as hereinafter claimed.

What is claimed is:

1. A fuel directing reaction device for a passive fuel cell comprising:
    a substrate, which has a first side and a second side opposite to the first side;
    a fuel reservoir, which is disposed on the first side of the substrate;
    a fuel introducing microfluidic channel portion, which is disposed on the first side of the substrate and connected with the fuel reservoir, wherein the fuel introducing microfluidic channel portion can self-propel a fuel from the fuel reservoir by a capillary force;
    a first rib array portion, which is disposed on the first side of the substrate, and connected with the fuel introducing microfluidic channel portion, wherein the first rib array portion comprises a plurality of first ribs in an interlaced arrangement and each of which has a V-shaped portion with an open side toward the fuel introducing microfluidic channel portion;
    a second rib array portion, which is disposed on the first side of the substrate, and connected with the first rib array, wherein the second rib array portion comprises a plurality of second ribs in an interlaced arrangement and each has a V-shaped portion with an open side toward the first rib array portion; and
    a plurality of reaction holes, each of which is disposed on the open side of the V-shaped portion of the second ribs and extends through the substrate to connect the first side and the second side of the substrate.

2. The fuel directing reaction device as claimed in claim 1, wherein each of the reaction holes has a plurality of carbon nanotubes decorated with catalysts incorporated into inner walls thereof.

3. The fuel directing reaction device as claimed in claim 2, wherein the inner walls of the reaction holes vertically extend through the substrate, and the length of the carbon nanotubes has a decreasing trend from the second side of the substrate to the first side of the substrate so as to form the taper reaction holes expanded toward the direction of the first side of the substrate.

4. The fuel directing reaction device as claimed in claim 1, wherein the reaction holes on the first side of the substrate have a hole diameter in a range of 10-50 μm.

5. The fuel directing reaction device as claimed in claim 1, wherein the first ribs and the second ribs are triangle ribs, V-shaped ribs, Y-shaped ribs or a combination thereof.

6. The fuel directing reaction device as claimed in claim 1, wherein the first rib array portion further comprises a plurality of arrow-shaped ribs disposed among the first row of the first rib array portion, and the first row is defined as the most adjacent row to the fuel introducing microfluidic channel portion.

7. The fuel directing reaction device as claimed in claim 1, wherein the fuel introducing microfluidic channel includes microfluidic channels having a width of less than 5 μm.

8. The fuel directing reaction device as claimed in claim 1, wherein the fuel introducing microfluidic channel includes microfluidic channels having inner walls coated with a hydrophilic material or subjected to a hydrophilic treatment.

9. The fuel directing reaction device as claimed in claim 1, wherein the V-shaped portion of the first ribs has a projective length ratio of a lateral side to an axial side from 2:1 to 2:5.

10. The fuel directing reaction device as claimed in claim 1, wherein the V-shaped portion of the second ribs has a projective length ratio of a lateral side to an axial side from 2:1 to 2:5.

11. The fuel directing reaction device as claimed in claim 1, wherein the interlaced arrangement of the first and second V-shaped ribs are capable of delivering the fuel uniformly and rapidly to a delivery and reaction zone by a nozzle-diffuser effect.

\* \* \* \* \*